United States Patent

Shimoyama et al.

[11] Patent Number: 5,757,578
[45] Date of Patent: May 26, 1998

[54] TAPE CASSETTE LOADING APPARATUS

[75] Inventors: Koichi Shimoyama; Ikuichiro Nawa, both of Atsugi, Japan; Geoff Mansbridge, Kingswood; David Moseley, Clifton, both of United Kingdom

[73] Assignees: Mitsumi Electric Co., Ltd., Japan; Hewlett-Packard Company, Palo Alto, Calif.

[21] Appl. No.: 525,362

[22] Filed: Sep. 7, 1995

[30] Foreign Application Priority Data

Sep. 9, 1994 [JP] Japan .................... 6-215707

[51] Int. Cl.$^6$ .............................. G11B 15/675
[52] U.S. Cl. .................................... 360/96.5
[58] Field of Search .............. 360/96.5, 93; 242/338, 242/338.4

[56] References Cited

U.S. PATENT DOCUMENTS

| 5,191,494 | 3/1993 | Lee | 360/96.5 |
| 5,500,778 | 3/1996 | Ahn | 360/96.5 |
| 5,504,730 | 4/1996 | Kanada | 369/75.1 |

FOREIGN PATENT DOCUMENTS

| 0349293 | 1/1990 | European Pat. Off. . |
| 4228434 | 3/1993 | Germany . |
| 4231574 | 4/1993 | Germany . |

*Primary Examiner*—Stuart S. Levy
*Assistant Examiner*—William J. Klimonicz
*Attorney, Agent, or Firm*—Ladas & Parry

[57] ABSTRACT

A tape cassette loading apparatus includes: a cassette holder which moves a tape cassette to a loaded position when the tape cassette is inserted to move the cassette holder; a lid opener, including a rotatable portion, which opens a lid of the tape cassette when the tape cassette is inserted to bring the lid into contact with the rotatable portion of the lid opener; a cam slider which locks the cassette holder to a chassis when the tape cassette is not inserted; a first protecting unit which cancels the locking of the cassette holder to the chassis by moving the cam slider when the first protecting unit is rotated by the lid of the tape cassette; and a second protecting unit which includes a first portion connected to the first protecting unit and a second portion connected to the chassis. In the apparatus, when the tape cassette is inserted and the first protecting unit is rotated by the lid of the inserted tape cassette, the second protecting unit is rotated by the first protecting unit through the first portion to cancel the connection of the second portion to the chassis. When the tape cassette is not inserted, the connection of the second portion to the chassis is maintained.

7 Claims, 8 Drawing Sheets

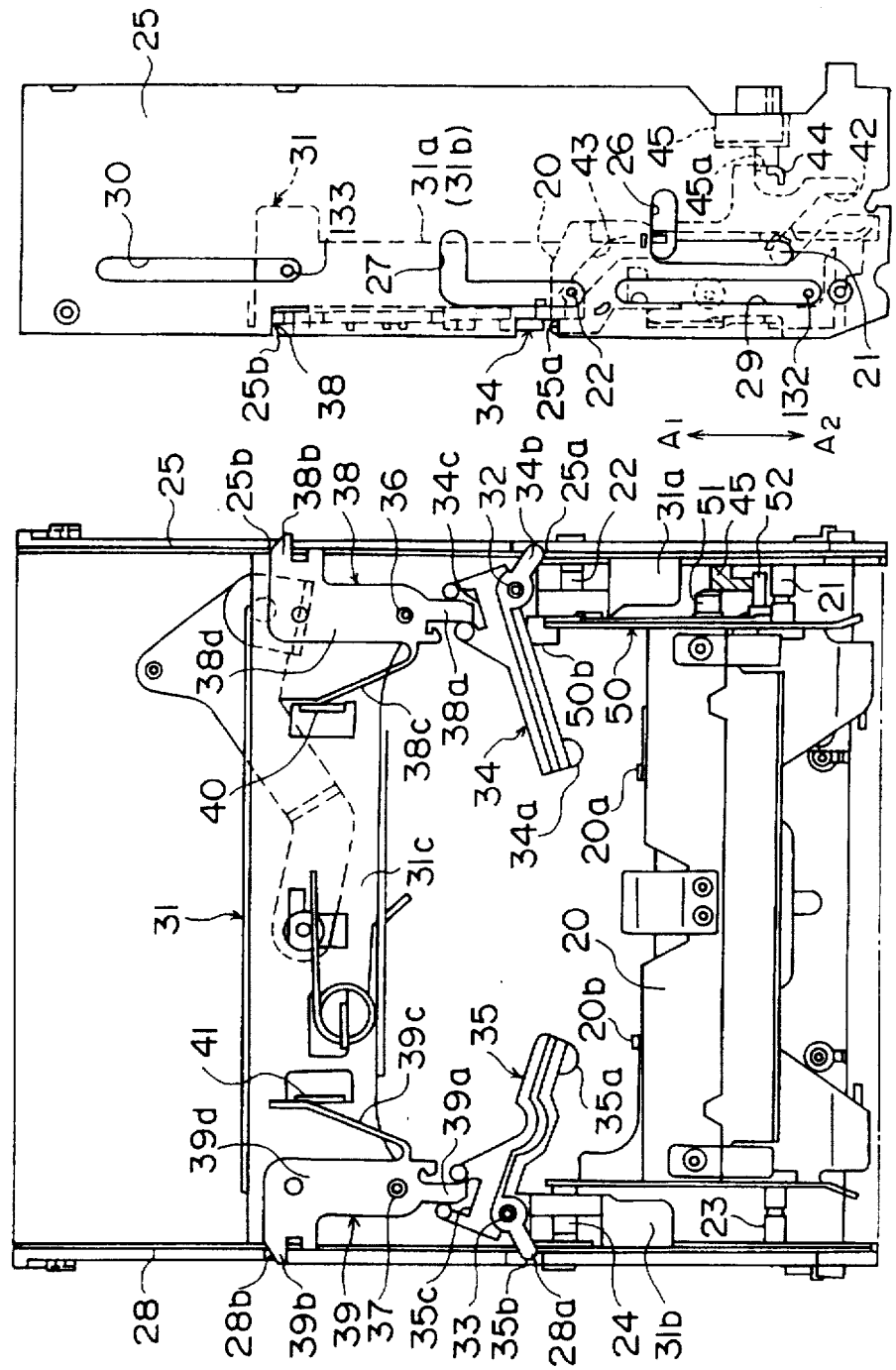

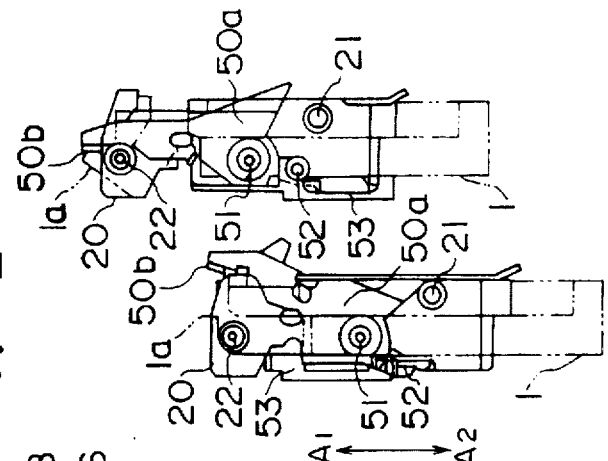
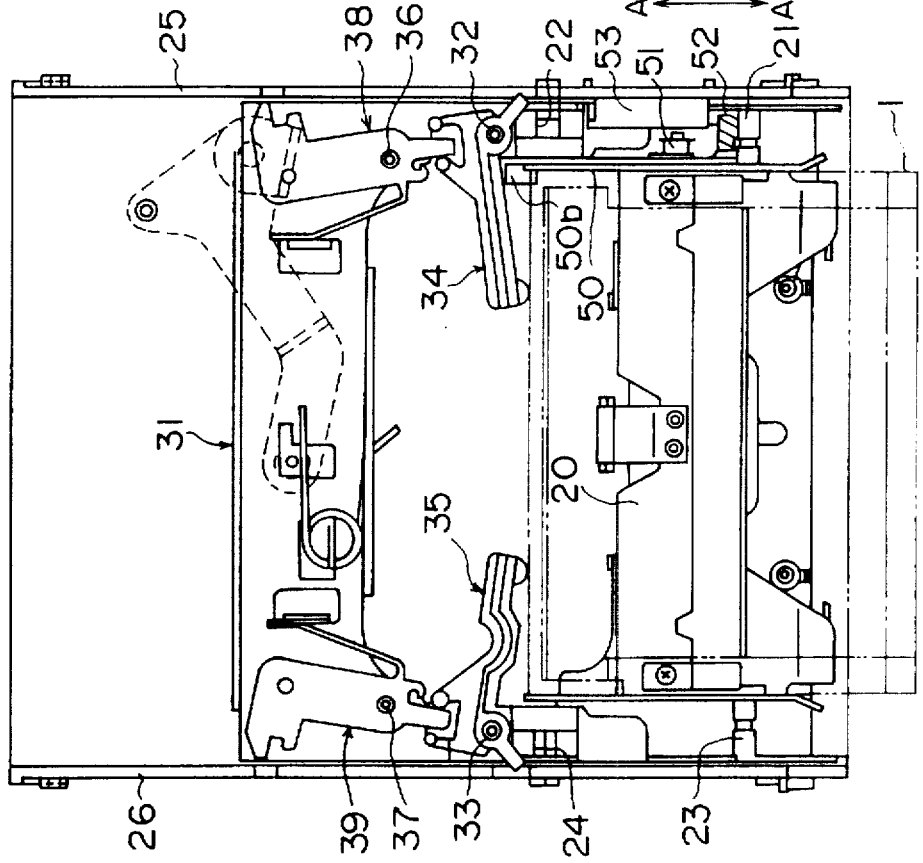

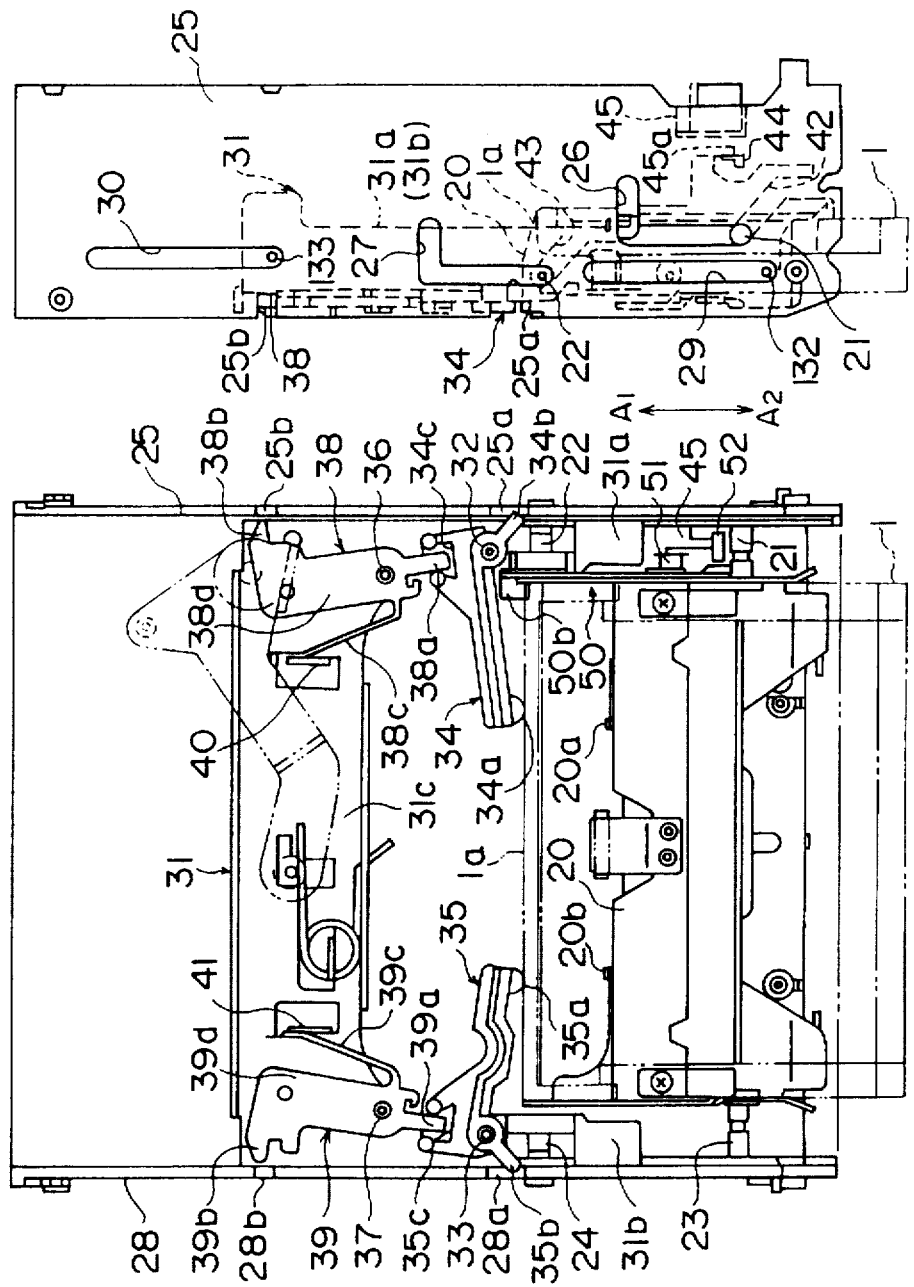

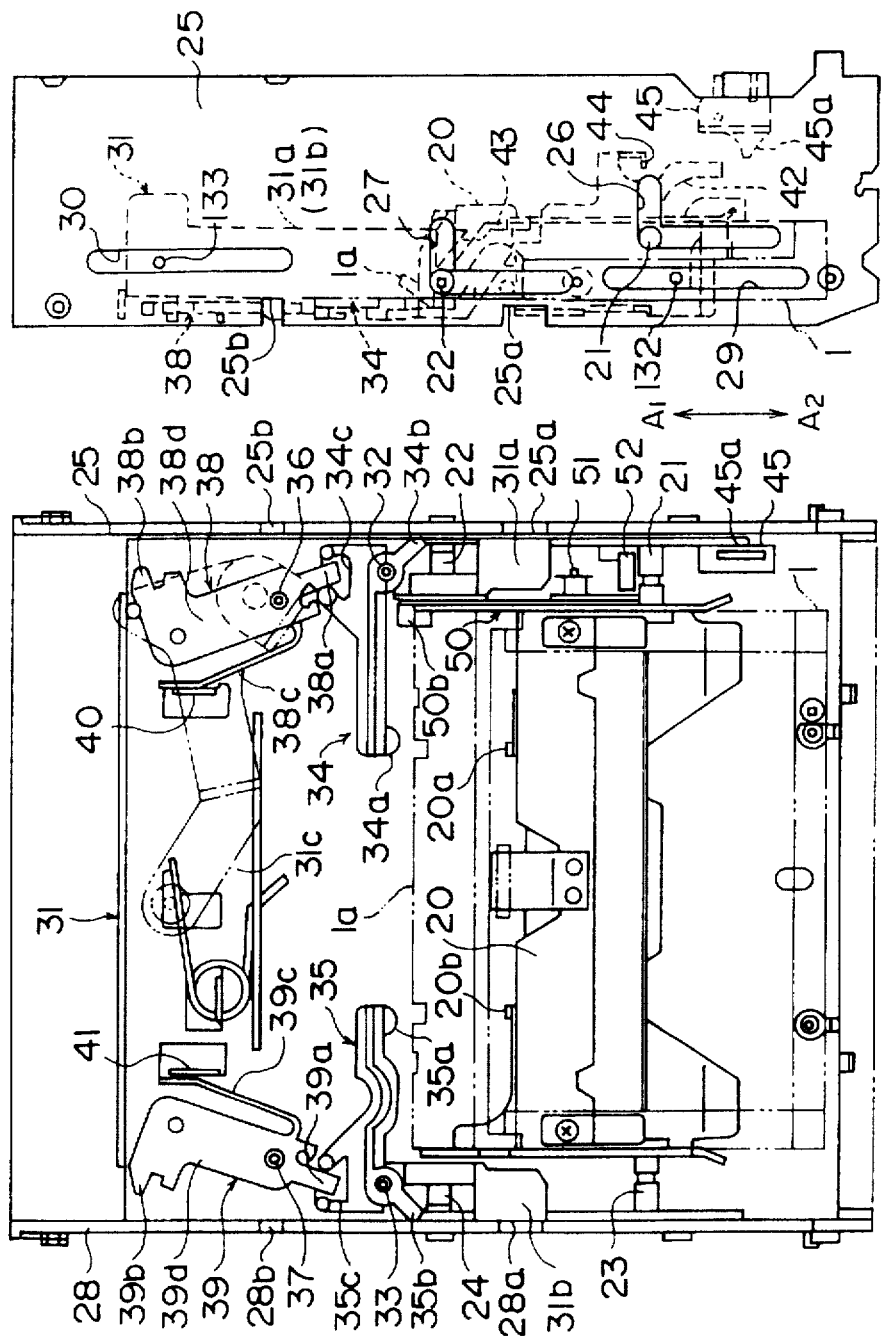

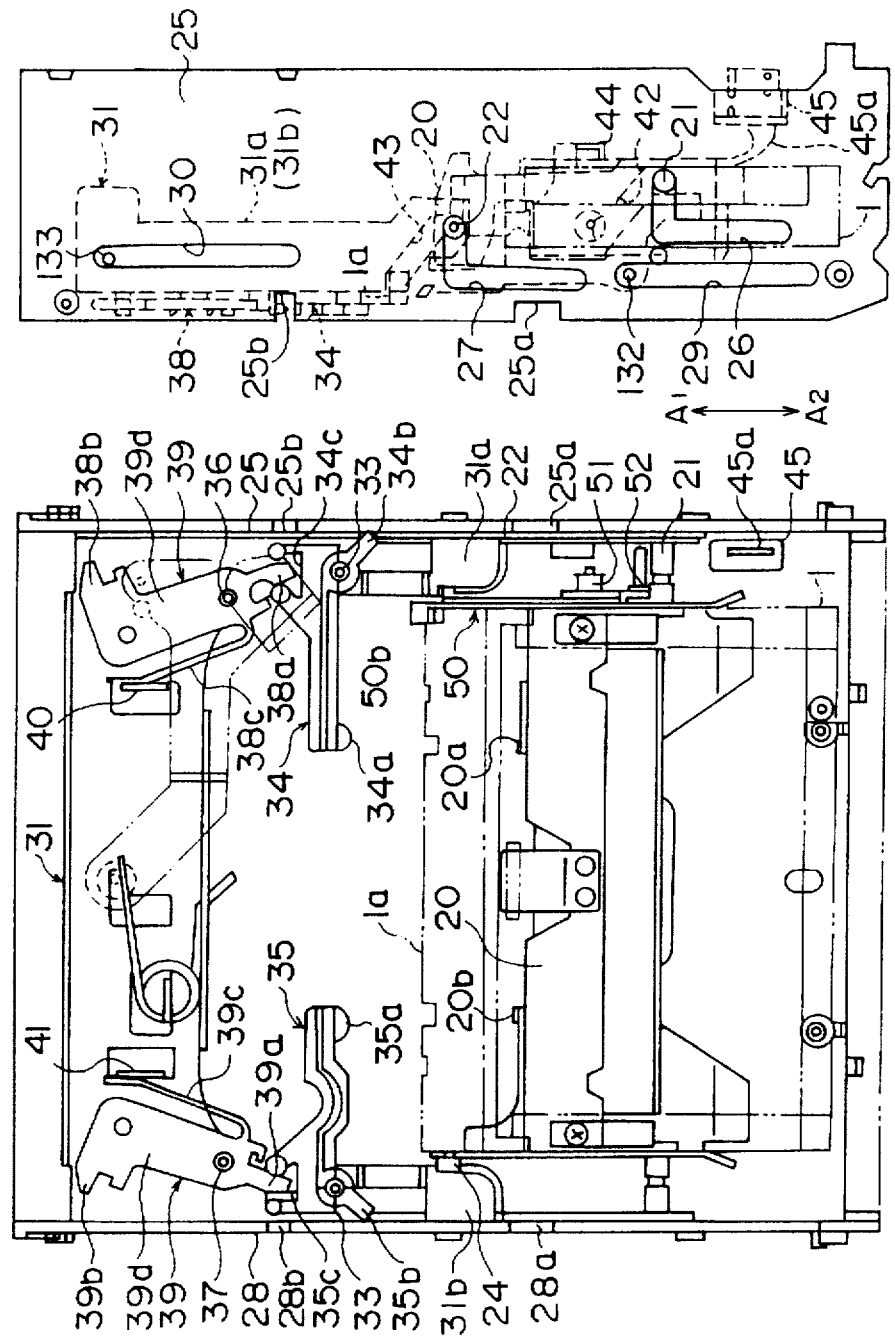

1

TAPE CASSETTE LOADING APPARATUS

BACKGROUND OF THE INVENTION

(1) Field of the Invention

The present invention relates to a tape cassette loading apparatus including a mechanism which prevents an erroneous loading of a tape cassette into a tape recorder system.

(2) Description of the Related Art

FIG. 1 shows a conventional tape cassette loading apparatus. FIG. 2A is a side view of the conventional tape cassette loading apparatus when a tape cassette 1 is placed at an intermediate position, and FIG. 2B is a side view of the conventional tape cassette loading apparatus when the tape cassette is placed at a loaded position. Also, an enlarged view of a portion of this apparatus is shown in FIG. 2C. The portion is indicated by a phantom line "A" in FIG. 2C, and the shaded area indicates an upper corner portion of the tape cassette 1. Further, an enlarged view of a portion of this apparatus is shown in FIG. 2D. The portion is indicated by a phantom line "B" in FIG. 2B, and the shaded area indicates an upper portion of the tape cassette 1.

This tape cassette apparatus forms a part of a digital audio tape recorder (called a DAT recorder). The DAT recorder is not shown in the drawings.

In FIGS. 1, 2A, and 2B, the tape cassette 1 and a sliding cover 14 are indicated by dotted lines. A cassette holder 2 is fixed to a chassis 8 and to a chassis 10. When the tape cassette 1 is inserted into the DAT recorder as shown in FIG. 2A, the cassette holder 2 is moved with the tape cassette 1 in an insert direction relative to the chassis 8 and 10. After this, when the tape cassette 1 is in the loaded position shown in FIG. 2B, the cassette holder 2 is brought into a position at which a tape from the tape cassette 1 is placed at a read/write position within the DAT recorder.

A pair of protector levers 3 and 4 are attached to the cassette holder 2 by a pair of supporting shafts 5 and 6, respectively. The protector levers 3 and 4 are rotatable around the supporting shafts 5 and 6, respectively. The protector levers 3 and 4 serve to inhibit a further movement of the cassette holder 2 in the insert direction if the tape cassette 1 is incorrectly inserted in a slanting direction. The protector levers 3 and 4 thereby prevent an erroneous loading of the tape cassette 1 into the DAT recorder. The supporting shafts 5 and 6 outwardly project from the sides of the cassette holder 2.

A lid lever 7 is rotatably supported on the supporting shaft 5 on the right side surface of the cassette holder 2. The lid lever 7 is shown in FIG. 1 only, and not shown in FIGS. 2A and 2B. This lid lever 7 serves to open a lid 1a of the tape cassette 1 when the tape cassette 1 is inserted.

The lid lever 7 has a bent portion 7a at a leading edge of the lid lever 7. When an upper corner portion of the inserted tape cassette 1 reaches the bent portion 7a of the lid lever 7, the bent portion 7a is upwardly raised by the tape cassette 1 and the lid 1a of the tape cassette 1 is opened.

A protector shaft 9 is secured to the chassis 8, and a protector shaft 11 is secured to the chassis 10. The protector shafts 9 and 11 inwardly project toward the cassette holder 2.

Next, a description will be given of an operation of the above protector lever 3 when the tape cassette 1 is inserted. An operation of the protector lever 4 is the same as that of the protector lever 3, and a description thereof will be omitted.

As shown in FIGS. 2A and 2B, the protector lever 3 has a lever portion 3a to the left (in a remove direction of the tape cassette 1) of the supporting shaft 5 and a lever portion 3c to the right (in the insert direction) of the supporting shaft 5. A hook portion 3b is provided at a leading edge of the lever portion 3a, and a bent portion 3d is provided at a leading edge of the lever portion 3c.

The bent portion 3d of the protector lever 3 is at an outward location deviating from a location of the bent portion 7a of the lid lever 7 along the remove direction. When the tape cassette 1 is inserted, the hook portion 3b is connected to the protector shaft 9 so that a further movement of the cassette holder 2 in the insert direction with the tape cassette 1 is initially inhibited.

In FIGS. 2A and 2B, the protector lever 3 is biased clockwise around the supporting shaft 5 by a spring (not shown). When the tape cassette 1 is inserted in the cassette holder 2, the bent portion 3d is upwardly raised by the upper corner portion of the tape cassette 1 as shown in FIG. 2C. As the tape cassette 1 is further moved in the insert direction, the protector lever 3 is rotated counterclockwise against the biasing force of the spring, as shown in FIG. 2D. Thus, an insertion of the tape cassette 1 is detected by this rotation of the protector lever 3.

When the protector lever 3 is rotated counterclockwise, the locking of the hook portion 3b by the shaft 9 is released. If the tape cassette 1 is correctly inserted in the cassette holder 2 in the insert direction, not in a slanting direction, the protector levers 3 and 4 are rotated by the tape cassette 1 to release the locking of the hook portions of the protector levers 3 and 4 by the shafts 9 and 11. If the tape cassette 1 is incorrectly inserted in the cassette holder 2 in a slanting direction, one of the protector levers 3 and 4 is not rotated and the other is rotated by the tape cassette 1 so that the insertion of the tape cassette 1 is prevented by the locking of the hook portion of one of the protector levers 3 and 4.

As shown in FIG. 1, a pair of projections 12 and 13 are provided on inside edges of a bottom of the cassette holder 2. The tape cassette 1 has the sliding cover 14 at a bottom of the tape cassette 1, and the sliding cover 14 is locked by a pair of sliding locks (not shown) when the tape cassette 1 is not still inserted in the cassette holder 2.

As shown in FIGS. 2A and 2B, a pair of projections 15 and 16 are provided on the cassette holder 2. When the tape cassette 1 is inserted in the cassette holder 2, the sliding locks of the tape cassette 1 are pressed by the projections 15 and 16 to release the locking of the sliding cover 14. As the sliding cover 14 of the tape cassette 1 is unlocked by the projections 15 and 16, the sliding cover 14 is opened and moved in the remove direction by the projections 12 and 13, so that the tape can be taken out from the opening of the tape cassette 1 and the tape can be placed at the read/write position within the DAT recorder.

However, in the above-described conventional apparatus, the tape cassette 1 may not be correctly placed in the loaded position because the locking of the hook portions of the protector levers 3 and 4 is released immediately when the slide cover 14 is moved to uncover the opening of the bottom of the tape cassette 1. If the tape cassette 1 at this time is forced into the cassette holder 2, the tape from the tape cassette 1 may not be correctly loaded in the DAT recorder and the slide cover 14 is not fully opened.

In addition, in the above-described conventional apparatus, the bent portion 3d of the protector lever 3 is at the outward location deviating from the location of the bent portion 7a of the lid lever 7 along the insert/remove directions. If the tape cassette 1 is forced into the cassette holder 2, the tape from the tape cassette 1 may not be correctly loaded in the DAT recorder and the lid 1a is not fully opened.

SUMMARY OF THE INVENTION

An object of the present invention is to provide an improved tape cassette loading apparatus in which the above-described problems are eliminated.

Another object of the present invention is to provide a tape cassette loading apparatus which reliably prevents an erroneous loading of the tape cassette into a tape recorder system and always opens the lid of the tape cassette when the tape cassette is inserted to a lid opening position.

The above-mentioned object of the present invention is achieved by a tape cassette loading apparatus which includes: a cassette holder for moving a tape cassette to a loaded position within a tape recorder system when the tape cassette is inserted into the cassette holder to move the cassette holder; a lid opener, including a portion rotatable with the movement of the cassette holder, for opening a lid of the tape cassette when the tape cassette is inserted to bring the lid into contact with the rotatable portion of the lid opener; a cam slider for locking the cassette holder to a chassis when the tape cassette is not inserted; a first protecting unit, rotatably supported on the cam slider, for canceling the locking of the cassette holder to the chassis by moving the cam slider when the first protecting unit is rotated by the lid of the tape cassette; and a second protecting unit, rotatably supported on the cam slider, which includes a first portion connected to the first protecting unit and a second portion connected to the chassis, wherein, when the tape cassette is inserted and the first protecting unit is rotated by the lid of the inserted tape cassette, the second protecting unit is rotated by the first protecting unit through the first portion to cancel the connection of the second portion to the chassis, and, when the tape cassette is not inserted, the connection of the second portion to the chassis is maintained.

In the tape cassette loading apparatus according to the present invention, when the tape cassette is not inserted into the cassette holder, the cam slider locks the cassette holder to the chassis in conjunction with the first protecting unit and the second protecting unit. When the tape cassette is inserted to bring the lid of the tape cassette into contact with the rotatable portion of the lid opener, the locking of the cassette holder to the chassis is canceled and the movement of the cassette holder enables the tape cassette to be placed at the loaded position. At the same time that the tape cassette is loaded, the lid of the tape cassette is always opened by the lid opener. In addition, an erroneous loading of the tape cassette into the tape recorder system can be reliably prevented by the first protecting unit and the second protecting unit.

BRIEF DESCRIPTION OF THE DRAWINGS

Other objects, features and advantages of the present invention will be more apparent from the following detailed description when read in conjunction with the accompanying drawings in which:

FIGS. 3A and 3B are top and side views of a tape cassette loading apparatus in one embodiment of the present invention;

FIGS. 4A, 4B, and 4C are views showing a lid opener of the tape cassette loading apparatus;

FIGS. 6A and 6B are top and side views showing a condition of the tape cassette loading apparatus when the tape cassette is inserted;

FIGS. 7A and 7B are top and side views showing a condition of the tape cassette loading apparatus when a cassette holder is moved with the tape cassette; and FIGS. 8A and 8B are top and side views showing a condition of the tape cassette loading apparatus when the loading of the tape cassette into the DAT recorder is finished.

DESCRIPTION OF THE PREFERRED EMBODIMENT

Figure 1:
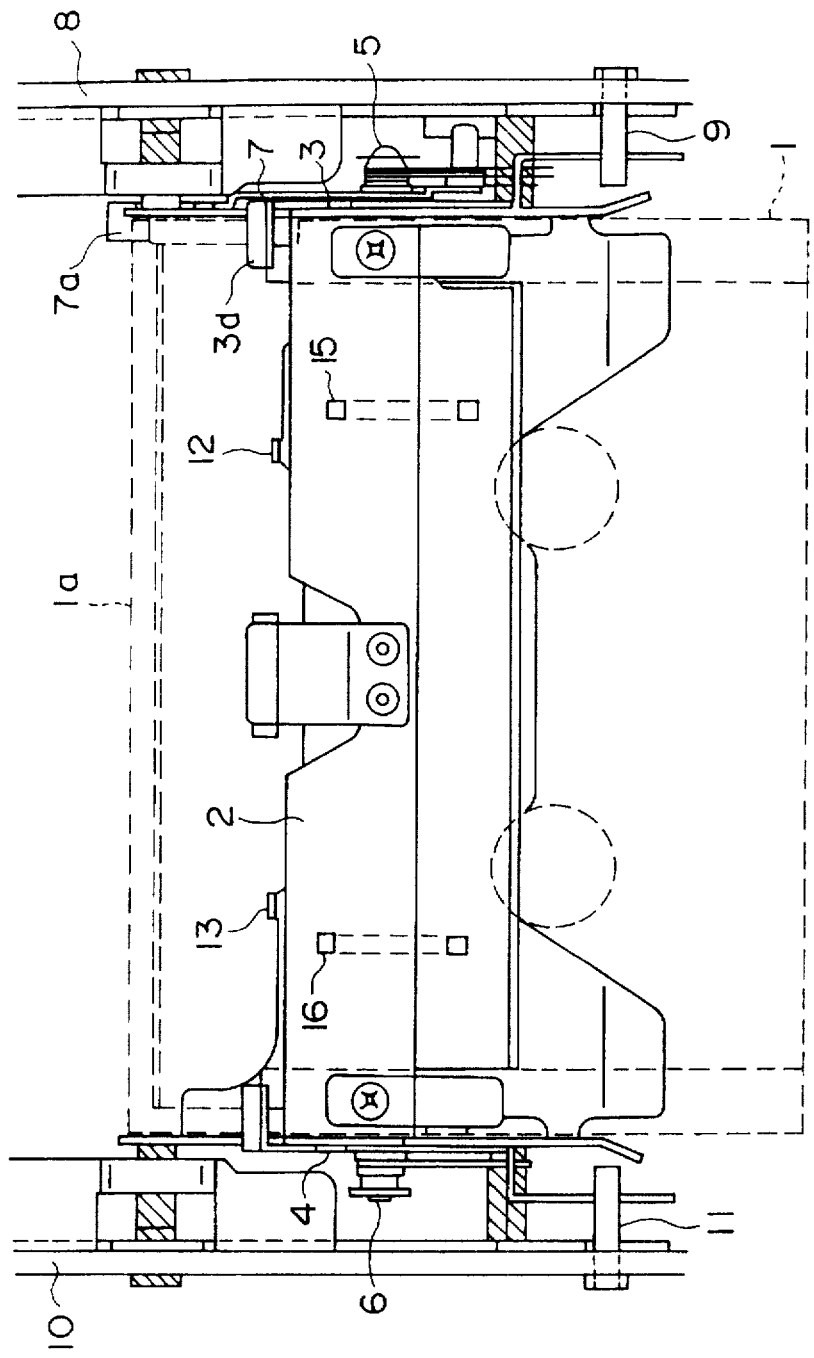
FIG. 1 is a top view of a conventional tape cassette loading apparatus.
Figure 2C:
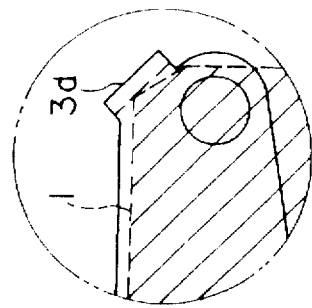
FIGS. 2C and 2D are enlarged partial views.
Figure 2D:
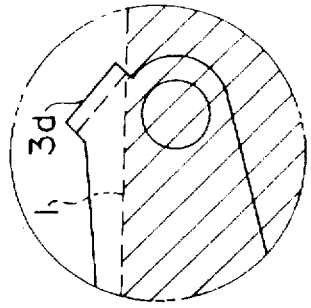
Figure 2A:
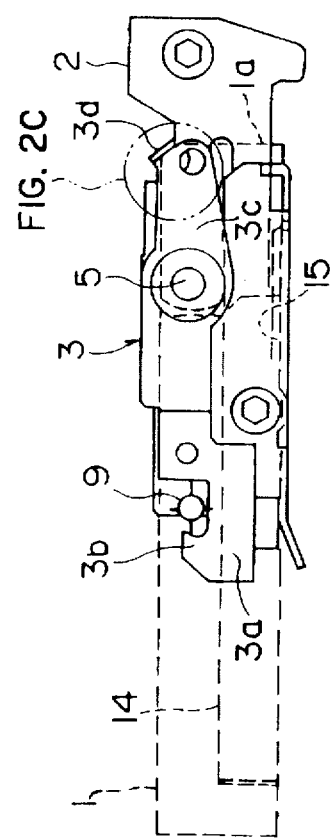
FIGS. 2A and 2B are side views of the conventional tape cassette loading apparatus when a tape cassette is placed at an intermediate position and when it is placed at a loaded position.
Figure 2B:
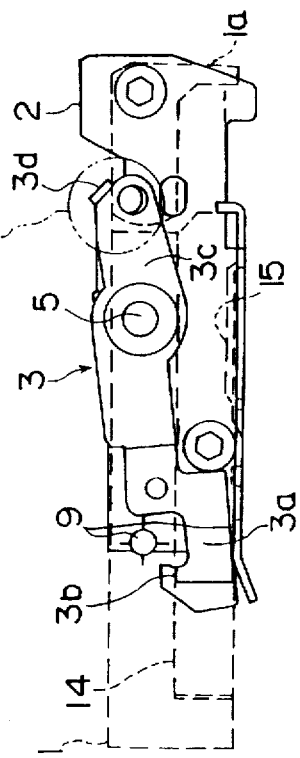

A description will now be given of a preferred embodiment of the present invention with reference to the accompanying drawings.

FIGS. 3A and 3B show a tape cassette loading apparatus in one embodiment of the present invention. In the tape cassette loading apparatus in FIGS. 3A and 3B, the tape cassette is still not inserted.

In FIGS. 3A and 3B, a cassette holder 20 has top and bottom surfaces, and right and left side surfaces, and it is formed into a generally rectangular, flat, and box-like member. The tape cassette is inserted into an opening of the cassette holder 20 at a front side. Shafts 21 and 22 are attached to the cassette holder 20, and they outwardly project from the right-side surface of the cassette holder 20 in transverse directions. Shafts 23 and 24 are attached to the cassette holder 20, and they outwardly project from the left-side surface of the cassette holder 20 in transverse directions.

Similarly to the above conventional apparatus, a pair of projections 20a and 20b are provided on inside edges of the bottom surface of the cassette holder 20. The sliding cover of the tape cassette is locked by a pair of sliding locks (not shown) when the tape cassette is not still inserted in the cassette holder 20. The projection 20a and 20b serve to open the sliding cover of the tape cassette when the tape cassette is correctly inserted in the cassette holder 20.

A chassis 25 and a chassis 28 are provided to support the cassette holder 20. As shown in FIG. 3B, the chassis 25 has an L-shaped guide groove 26, and one end of the shaft 21 is connected to the guide groove 26. Also, the chassis 25 has an L-shaped guide groove 27, and one end of the shaft 22 is connected to the guide groove 27. Thus, movements of the cassette holder 20 relative to the chassis 25 and 28 in insert and remove directions (which are indicated by arrows "A1" and "A2") are guided by the connections of the shafts 21 and 22 to the guide grooves 26 and 27.

Further, the chassis 25 has two straight guide grooves 29 and 30 which extend along the insert and remove directions "A1" and "A2".

The chassis 28 is formed to be symmetrical to the chassis 25, and the chassis 28 has two L-shaped guide grooves (not shown) to which the shafts 23 and 24 are connected respectively. The structure of the chassis 28 is the same as the structure of the chassis 25. Thus, a description of the chassis 28 will be omitted.

In FIGS. 3A and 3B, a cam slider 31 is provided in the tape cassette loading apparatus. The cam slider 31 is made of a sheet metal.

The cam slider 31 has a right-side portion 31a and a left-side portion 31b. Two connecting portions 132 and 133, which outwardly project from the right-side portion 31a, are connected to the straight guide grooves 29 and 30 of the chassis 25. Also, two connecting portions (not shown), which outwardly project from the left-side portion 31b, are connected to two straight guide grooves (not shown) of the chassis 28. Thus, movements of the cam slider 31 in the insert and remove directions "A1" and "A2" are guided by the connections of the connecting portions to the guide grooves of the chassis 25 and 28.

Also, the cam slider 31 has a channel portion 31c which interconnects the right-side portion 31a and the left-side portion 31b. Thus, the channel portion 31c, the right-side portion 31a, and the left-side portion 31b are integrally formed into an inverted-U shape.

A supporting shaft 32 is provided on a top surface of the right-side portion 31a, and a supporting shaft 33 is provided on a top surface of the left-side portion 31b. A pair of protectors 34 and 35 are rotatably supported on the right-side and left-side portions 31a and 31b of the cam slider 31 by the supporting shafts 32 and 33 as shown in FIG. 3A.

A semicircular projection 34a is provided at one end of the protector 34, and a sliding portion 34b having a U-shaped cross section is provided at the other end of the protector 34. When the tape cassette is inserted in the cassette holder 20, the projection 34a is pressed by the lid of the tape cassette and the protector 34 is rotated around the supporting shaft 32. The sliding portion 34b at the other end of the protector 34, at the time the tape cassette is still not inserted, is located within a cut-out portion 25a of the chassis 25. Further, the protector 34 has a recessed portion 34c in the vicinity of the supporting shaft 32.

In addition, a semicircular projection 35a is provided at one end of the protector 35, and a sliding portion 35b having a U-shaped cross section is provided at the other end of the protector 35. When the tape cassette is inserted in the cassette holder 20, the projection 35a is pressed by the lid of the tape cassette and the protector 35 is rotated around the supporting shaft 33. The sliding portion 35b at the other end of the protector 35, at the time the tape cassette is still not inserted, is located within a cut-out portion 28a of the chassis 28. Further, the protector 35 has a recessed portion 35c in the vicinity of the supporting shaft 33.

A supporting shaft 36 is provided on the cam slider 31 at a position where the right-side portion 31a and the channel portion 31c are connected. Also, a supporting shaft 37 is provided on the cam slider 31 at a position where the left-side portion 31b and the channel portion 31c are connected. A pair of protecting levers 38 and 39 are rotatably supported on the cam slider 31 by the supporting shafts 36 and 37.

In the above-mentioned embodiment, the protecting levers 38 and 39 are made of a resin material, and they may be molded by using an integral molding process of the resin material. Commonization of the protecting levers 38 and 39 will enable the cost of the manufacture to be reduced.

A projecting portion 38a which projects from the protecting lever 38 in the remove direction "A2" is provided at one end of the protecting lever 38, and a connecting portion 38b which projects from the protecting lever 38 in a transverse direction is provided at the other end of the protecting lever 38. The projecting portion 38a is connected to the recessed portion 34c of the protector 34. The connecting portion 38b is connected to a cut-out portion 25b of the chassis 25 when the tape cassette is still not inserted. Further, the protecting lever 38 has a spring portion 38c which extends in a slanting direction from a portion of the protecting lever 38 in the vicinity of the supporting shaft 36.

Also, a projecting portion 39a which projects from the protecting lever 39 in the remove direction "A2" is provided at one end of the protecting lever 39, and a connecting portion 39b which projects from the protecting lever 39 in a transverse direction is provided at the other end of the protecting lever 39. The projecting portion 39a is connected to the recessed portion 35c of the protector 35. The connecting portion 39b is connected to a cut-out portion 28b of the chassis 28 when the tape cassette is still not inserted. Further, the protecting lever 39 has a spring portion 39c which extends in a slanting direction from a portion of the protecting lever 39 in the vicinity of the supporting shaft 37.

The spring portions 38c and 39c may be made of a resin material which is the same as the resin material of each of the protecting levers 38 and 39. Otherwise, the spring portions 38c and 39c may be made of a metal material if the metal material has an appropriate elasticity.

The channel portion 31c of the cam slider 31 includes a pair of raised portions 40 and 41. A leading edge of the spring portion 38c is attached to the raised portion 40 of the cam slider 31, and a leading edge of the spring portion 39c is attached to the raised portion 41 of the cam slider 31.

Accordingly, the protecting lever 38 is biased clockwise around the supporting shaft 36 by the spring portion 38c with the connecting portion 38b being pressed toward the chassis 25, and the protecting lever 39 is biased counterclockwise around the supporting shaft 37 by the spring portion 39c with the connecting portion 39b being directed toward the chassis 28. Therefore, when the tape cassette is still not inserted, the connecting portion 38b and the connecting portion 39b are reliably connected to the cut-out portion 25b and the cut-out portion 28b, respectively. Thus, movements of the cam slider 31 in the insert and remove directions "A1" and "A2", at the time the tape cassette is not inserted, are inhibited by the connections of the connecting portions 38b and 39b to the chassis 25 and 28.

The right-side portion 31a of the cam slider 31 includes a pair of grooves 42 and 43 which extend in slanting directions with respect to the insert direction "A1". The shafts 21 and 22 projecting from the right-side surface of the cassette holder 20 are connected to the grooves 42 and 43. That is, the shaft 21 is connected to not only the guide groove 26 but also the groove 42, and the shaft 22 is connected to not only the guide groove 27 but also the groove 43.

Further, the right-side portion 31a includes an L-shaped bent portion 44 on the bottom of the right-side portion 31a. This bent portion 44 is attached to a lever 45a of a start switch 45 of the DAT recorder. When the tape cassette is still not inserted, the bent portion 44 is attached to the lever 45a, and the start switch 45 at this time is turned OFF by the connection of the bent portion 44 to the lever 45a.

A cam slider drive unit (not shown) is run or stopped by turning the start switch 45 ON or OFF. The cam slider drive unit includes a motor which serves to move the cam slider 31 in the insert direction "A1" relative to the chassis 25 and 28. When the tape cassette is inserted in the cassette holder 20, the start switch 45 is turned ON and the cam slider drive unit is driven to move the cam slider 31 in the insert direction "A1" relative to the chassis 25 and 28.

FIGS. 4A, 4B, and 4C show a lid opener 50 of the tape cassette loading apparatus. This lid opener 50 serves to open the lid of the tape cassette when the tape cassette is inserted in the cassette holder 20. FIG. 4A is a top view of the lid opener 50, and FIGS. 4B and 4C are right-side views of the lid opener 50. In FIGS. 4A, 4B, and 4C, the elements which are the same as corresponding elements in FIGS. 3A and 3B are designated by the same reference numerals. In FIG. 3B, the lid opener 50 is omitted, for the sake of convenience.

Referring to FIGS. 4A, 4B and 4C, the lid opener 50 is rotatably supported on the right-side surface of the cassette holder 20 by a supporting shaft 51. The supporting shaft 51 outwardly projects from the right-side surface of the cassette holder 20. In FIG. 4B, the lid opener is biased clockwise by a spring (not shown).

The lid opener 50 includes a lever portion 50a and a bent portion 50b. The lever portion 50a is provided at an end portion of the lid opener 50 deviating from the location of the shaft 51 in the remove direction "A2". The bent portion 50b is provided at the other end portion of the lid opener 50 deviating from the location of the shaft 51 in the insert direction "A1". A cylindrical shaft 52 is rotatably supported on the right-side surface of the cassette holder 20, and the center line of the shaft 52 deviates from the center line of the shaft 51 in the remove direction "A2". The shaft 52 outwardly projects from the cassette holder 20 in a transverse direction, and the lever portion 50a serves to fix the rotation of the lid opener 50 around the shaft 51.

A lid cam 53 is secured to an inside surface of the chassis 25 at an upper portion of the inside surface.

Figure 5:
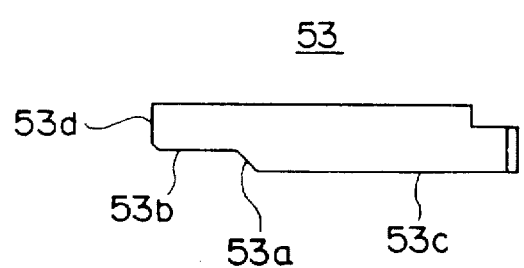
FIG. 5 is a side view of a lid cam of the tape cassette loading apparatus.

FIG. 5 shows the lid cam 53 of the tape cassette loading apparatus. As shown in FIG. 5, the lid cam 53 includes a curved portion 53 at a bottom of the lid cam 53, and the curved portion 53 is formed into a generally "S" shape. The curved portion 53a interconnects an upper straight portion 53b and a lower straight portion 53c. The straight portions 53b and 53c are parallel to each other. Also, the lid cam 53 includes an end surface 53d at one end of the lid cam 53.

Referring back to FIGS. 4A through 4C, an operation of the lid cam 53 will be explained. When the tape cassette is inserted and the cassette holder 20 is moved with the tape cassette in the insert direction "A1", the shaft 52 is rotated around its center by the movement of the cassette holder 20. At the same time, the lid opener 50 is moved along the bottom edge of the lid cam. That is, the shaft 52 is moved along the straight portion 53b of the lid cam 53 during the rotation, and the shaft 52 is lowered from the top of the chassis 25. The lid opener 50 at this time is rotated counterclockwise around the shaft 51 against the biasing force of the spring.

The lid 1a of the tape cassette 1 is opened by the lid opener 50 at a first stage when the shaft 52 is brought into contact with the end surface 53d and connected to the straight portion 53b. The lid 1a of the tape cassette 1 is further opened by the lid opener 50 at a second stage when the shaft 52 contacts the curved portion 53a and is connected to the straight portion 53c.

When the lid 1a of the tape cassette 1 is opened by the lid opener 50, the bent portion 50b of the lid opener 50 is brought into contact with the bottom edge of the lid 1a of the tape cassette 1. As the lid opener 50 is rotated counterclockwise around the shaft 51, the lid 1a of the tape cassette 1 is opened by an upward rotating force of the bent portion 50b.

Next, a description will be given of an operation of the tape cassette loading apparatus in one embodiment of the present invention, with reference to FIGS. 6A through 8B.

FIGS. 6A and 6B show a condition of the tape cassette loading apparatus when the tape cassette 1 is inserted. FIGS. 7A and 7B show a condition of the tape cassette loading apparatus when the cassette holder is moved with the tape cassette. FIGS. 8A and 8B show a condition of the tape cassette loading apparatus when the loading of the tape cassette into the DAT recorder is finished. In FIGS. 6A through 8B, the elements which are the same as corresponding elements in FIGS. 3A and 3B are designated by the same reference numerals.

Referring to FIGS. 6A and 6B, the tape cassette 1 is inserted by an operator into the cassette holder 20 in the insert direction "A1" in a correct manner. The lid 1a of the tape cassette 1, when inserted, pushes ahead both the projections 34a and 35a of the protectors 34 and 35.

As the projections 34a and 35a are pushed ahead by the lid 1a, the protector 34 is rotated clockwise around the shaft 32 and the protector 35 is rotated counterclockwise around the shaft 33. When the protector 34 is rotated clockwise, the protecting lever 38 is rotated counterclockwise around the supporting shaft 36 against the biasing force of the spring portion 38c by the connection of the projecting portion 38a to the recessed portion 34c. Similarly, when the protector 35 is rotated counterclockwise, the protecting lever 39 is rotated clockwise around the supporting shaft 37 against the biasing force of the spring portion 39c by the connection of the projecting portion 39a to the recessed portion 35c.

The tape cassette 1 is further inserted in the insert direction "A1" so that the lid 1a is brought into contact with the bent portion 50b of the lid opener 50. The protecting lever 38 is rotated counterclockwise as described above, and the connecting portion 38b is disconnected from the cut-out portion 25b of the chassis 25. Similarly, the protecting lever 39 is rotated clockwise as described above, and the connecting portion 39b is disconnected from the cut-out portion 28b of the chassis 28. Therefore, the locking of the cam slider 31 is released, and the cam slider 31 is movable in the insert direction "A1" with respect to the chassis 25 and 28. This movement of the cam slider 31 will be guided by the connections of the connecting portions 132 and 133 to the guide grooves 29 and 30.

The tape cassette 1 is further inserted in the insert direction "A1" and the cassette holder 20 is moved with the tape cassette, so that the tape cassette loading apparatus is in the condition shown in FIGS. 7A and 7B.

Referring to FIGS. 7A and 7B, the bent portion 44 of the cam slider 31 is separated from the lever 45a of the start switch 45, and the start switch 45 is turned ON. Thus, the above-mentioned cam slider drive unit is driven to move the cam slider 31 in the insert direction "A1".

When the cam slider 31 is moved in the insert direction "A1", the sliding portion 34b of the protector 34 is disconnected from the cut-out portion 25a of the chassis 25. The sliding portion 34b is moved in the insert direction "A1" relative to the chassis 25 and 28, and it is pressed onto the inside surface of the chassis 25 during this movement. The protector 34 is further rotated clockwise around the shaft 32, and the projection 34a is separated from the lid 1a of the tape cassette 1.

Similarly, the sliding portion 35b of the protector 35 is disconnected from the cut-out portion 28a of the chassis 28. The sliding portion 34b is moved in the insert direction "A1" relative to the chassis 25 and 28, and it is pressed onto the inside surface of the chassis 28 during the movement. The protector 35 is further rotated counterclockwise around the shaft 33, and the projection 35a is separated from the lid 1a of the tape cassette 1.

When both the projections 34a and 35a of the protectors 34 and 35 are separated from the lid 1a of the tape cassette 1; an internal space which is great enough to open the lid 1a of the tape cassette 1 without interference is provided. The lid opener 50 serves to reliably open the lid 1a of the tape cassette 1 as described above (see FIGS. 4A through 4C).

In the above embodiment, it is possible to always open the lid 1a of the tape cassette 1 immediately when the tape cassette 1 is inserted into the cassette holder 20.

The cam slider 31 is further moved in the insert direction "A1" by the cam slider drive unit so that the tape cassette loading apparatus is in the condition shown in FIGS. 8A and 8B. In FIGS. 8A and 8B, the loading of the tape cassette 1 into the DAT recorder is finished.

The shafts 21 and 22 (including the shafts 23 and 24) of the cassette holder 20 are lowered relative to the chassis 25 and 28 along the guide grooves 26 and 27 by the connections of the shafts 21 and 22 to the grooves 42 and 43. By this movement, the tape cassette 1 is placed at a loaded position, and the cassette holder 20 is brought into the position where a tape from the tape cassette 1 is placed at a read/write position within the DAT recorder.

In the above-described embodiment, when the tape cassette 1 is not inserted, the connecting portions 38b and 39b are connected to the cut-out portions 25b and 28b of the chassis 25 and 28, and the cam slider 31 is locked to the chassis 25 and 28 by the connections of the connecting portions 38b and 39b to the chassis 25 and 28. When the tape cassette 1 is inserted to a lid opening position where the lid 1a of the tape cassette 1 can be opened by the bent portion 50b of the lid opener 50, an erroneous loading prevention mechanism, including the protectors 34 and 35 and the protecting levers 38 and 39, releases the locking of the cam slider 31 to the chassis 25 and 28. When the locking of the cam slider 31 is released, the lid 1a of the tape cassette 1 is immediately opened by the bent portion 50b of the lid opener 50.

Accordingly, in the above-described embodiment, when the tape cassette 1 is inserted to the above lid opening position, the lid 1a of the tape cassette 1 can reliably be opened by the lid opener 50. Thus, it is possible to prevent the erroneous loading of the tape cassette into the DAT recorder.

An unloading of the tape cassette 1 from the DAT recorder is carried out by moving the cam slider 31 in the remove direction "A2" by utilizing the cam slider drive unit. The unloading operation can be carried out by performing the above-described loading operation in the reverse sequence. Therefore, a description of the unloading operation will be omitted.

In the above-described embodiment, the protecting levers 38 and 39, including the spring portions 38c and 39c and the lever portions 38d and 39d, are made of a resin material. The spring portions 38c and 39c are integrally molded with the protecting levers 38 and 39. However, springs or tension coil springs, attached to the protecting levers 38 and 39, may be used instead if such springs have the same function as the spring portions.

Further, the present invention is not limited to the above-described embodiment, and variations and modifications may be made without departing from the scope of the present invention.

What is claimed is:

1. A tape cassette loading apparatus comprising:

a cassette holder for guiding a tape cassette to a loaded position when the tape cassette is inserted thereby moving the cassette holder;

a lid opener, including a movable portion, for opening a lid of the tape cassette when the tape cassette is inserted so as to bring the lid into contact with said movable portion;

cam slider means for slidably mounting said cassette holder on a chassis and means for locking said cassette holder against sliding movement relative to the chassis when the tape cassette is not inserted;

a protection linkage comprising first protecting means and second protecting means;

wherein the first protecting means is rotatably supported on said cam slider means for releasing the locking of the cassette holder relative to the chassis when said first protecting means is rotated by the lid of the tape cassette being inserted; and the second protecting means is rotatably supported on said cam slider means and includes a first portion engaging said first protecting means and a second portion engageable with the chassis and comprising the locking means;

wherein, when the tape cassette is inserted and said first protecting means is rotated by the lid of the tape cassette, said second protecting means is rotated by engagement of the first portion with the first protecting means so as to release the locking means of the second protecting means from the chassis;

and wherein the protection linkage further comprises means to move the first protecting means away from the lid so as to allow the lid to open as the tape cassette is loaded.

2. The tape cassette loading apparatus according to claim 1, wherein said first protecting means and said second protecting means are not rotated to inhibit the movement of the cassette holder when the tape cassette is inserted and not placed at the loaded position, thereby preventing an erroneous loading of the tape cassette into a tape recorder system.

3. The tape cassette loading apparatus according to claim 1, wherein the movable portion of the lid opener is provided at a side corner portion of the cassette holder.

4. The tape cassette loading apparatus according to claim 1, wherein said cam slider means comprises grooves to which connecting portions are connected, the movement of the cam slider means being guided by the connections of the connecting portions to the grooves.

5. The tape cassette loading apparatus according to claim 1, wherein the movement of the cassette holder is guided by connection of connecting portions of the cam slider means to guide grooves of the chassis.

6. The tape cassette loading apparatus according to claim 1, wherein the first protecting means comprises a projection which engages a recess in the chassis and which is operable to move the first protecting means away from the lid when the projection abuts the end of the recess during insertion of the tape cassette.

7. The tape cassette loading apparatus according to claim 6, wherein the means to move the first protecting means away from the lid is also operable to move the second protecting means away from the chassis during loading of the tape cassette.

* * * * *